United States Patent
Cohen et al.

(10) Patent No.: US 12,051,281 B2
(45) Date of Patent: Jul. 30, 2024

(54) DIGITAL DISPLAY SYSTEM AND METHOD

(71) Applicant: Zuffa, LLC, Las Vegas, NV (US)

(72) Inventors: Alon Cohen, Silver Spring, MD (US); Abraham Genauer, Washington, DC (US); Antonio Ruano Cuesta, Madrid (ES); Pedro Ferreira, North Bethesda, MD (US)

(73) Assignee: Zuffa, LLC, Las Vegas, NV (US)

( * ) Notice: Subject to any disclaimer, the term of this patent is extended or adjusted under 35 U.S.C. 154(b) by 718 days.

(21) Appl. No.: 17/167,497

(22) Filed: Feb. 4, 2021

(65) Prior Publication Data

US 2021/0248839 A1 Aug. 12, 2021

Related U.S. Application Data

(60) Provisional application No. 62/971,586, filed on Feb. 7, 2020.

(51) Int. Cl.
*G08B 1/00* (2006.01)
*A63B 71/06* (2006.01)
(Continued)

(52) U.S. Cl.
CPC ............ *G07C 1/28* (2013.01); *A63B 71/0686* (2013.01); *A63C 19/005* (2013.01); *G06F 1/10* (2013.01);
(Continued)

(58) Field of Classification Search
CPC ... G07C 1/28; A63B 71/0686; A63B 2220/62; A63B 2225/20; A63B 2225/685; A63C 19/005; A63C 2203/24; G06F 1/10; G09F 9/33; G09F 9/301; G09F 23/16; G04G 21/04; G04F 10/00
See application file for complete search history.

(56) References Cited

U.S. PATENT DOCUMENTS 5,293,354 A * 3/1994 Costabile .................. G04F 8/08
455/100
6,369,697 B1 4/2002 Poole
(Continued)

FOREIGN PATENT DOCUMENTS

GB 2320771 A 1/1998

*Primary Examiner* — Toan N Pham
(74) *Attorney, Agent, or Firm* — Dickinson Wright PLLC

(57) ABSTRACT

A system for controlling a clock device is provided. The system includes a clock device in communication with a remote computing device. The remote device is configured to adjust the time of a countdown and define an adjusted time value. The remote device communicates the adjusted time to the clock device, which automatically displays the adjusted time on a screen. The adjusted time is further communicated to a cloud server via API. The adjusted time is accessible by authorized third parties for display or broadcast. Accordingly, a user may adjust and track a countdown and may define an official time that is automatically displayed to a variety of end-users in real-time. The clock device may be positioned adjacent a competition area and may include a rigid metal frame and a flexible LED screen extending around the perimeter of the frame. The clock device may include hardware and software for processing and outputting the adjusted time to the cloud server.

20 Claims, 8 Drawing Sheets

(51) Int. Cl.
 *A63C 19/00* (2006.01)
 *G06F 1/10* (2006.01)
 *G07C 1/28* (2006.01)
 *G09F 9/33* (2006.01)

(52) U.S. Cl.
 CPC ............ *G09F 9/33* (2013.01); *A63B 2220/62* (2013.01); *A63B 2225/20* (2013.01); *A63B 2225/685* (2013.01); *A63C 2203/24* (2013.01)

(56) References Cited

U.S. PATENT DOCUMENTS

| | | | |
|---|---|---|---|
| 6,725,107 B2 * | 4/2004 | MacPherson | G06F 16/954 273/459 |
| 9,393,485 B2 * | 7/2016 | Sullivan | A63F 11/0051 |
| 9,883,332 B2 * | 1/2018 | Hansen | G16H 40/63 |
| 10,328,328 B2 * | 6/2019 | Benkreira | G07C 1/22 |
| 2003/0058744 A1 | 3/2003 | Calace | |
| 2004/0184354 A1 | 9/2004 | McDonald | |
| 2006/0109089 A1 * | 5/2006 | Boehm | G04F 10/00 340/326 |
| 2011/0032086 A1 | 2/2011 | Cabrera | |
| 2017/0353758 A1 * | 12/2017 | Senew | H04N 21/44008 |
| 2018/0280783 A1 | 10/2018 | Gordon | |

* cited by examiner

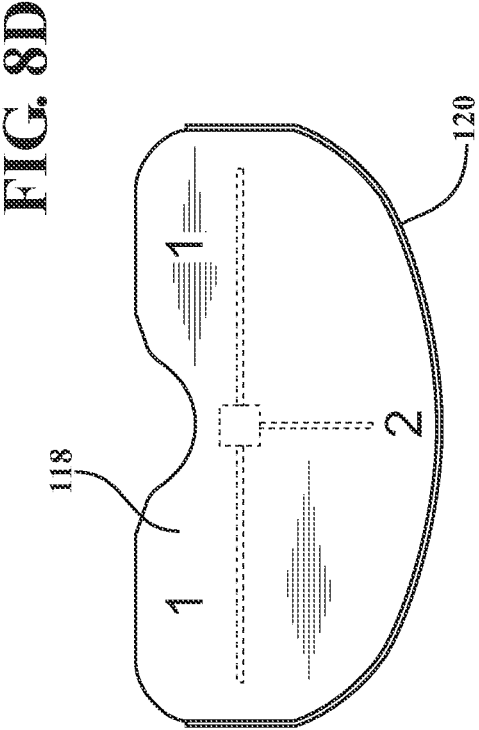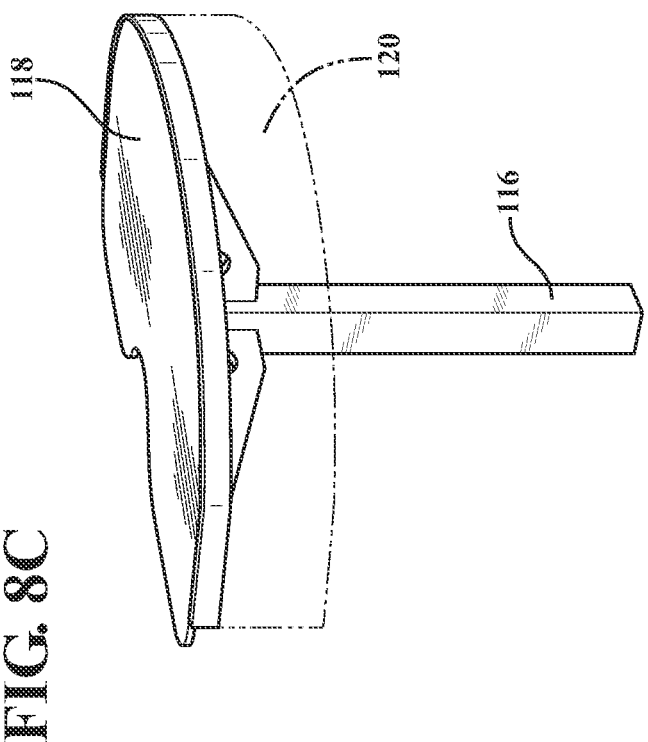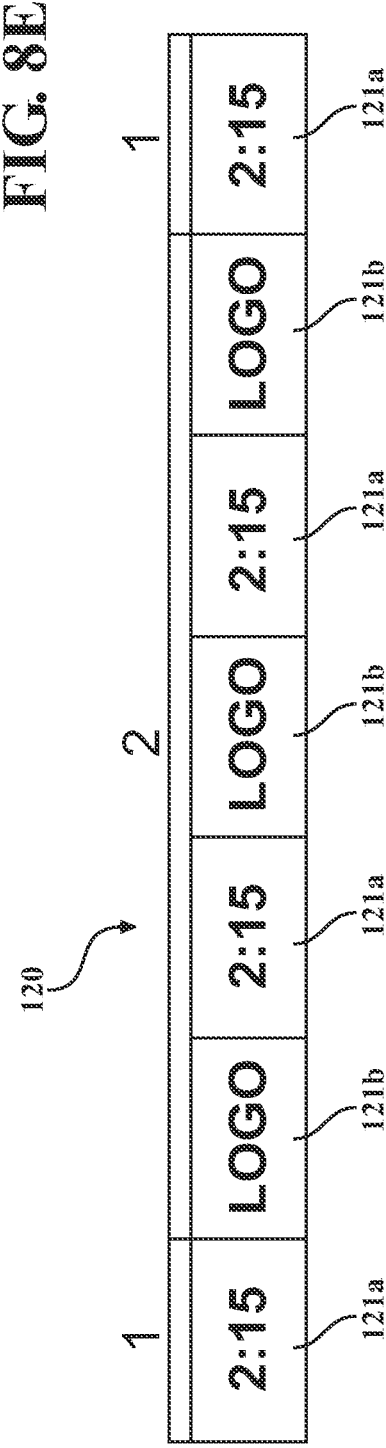

DIGITAL DISPLAY SYSTEM AND METHOD

CROSS-REFERENCE TO RELATED APPLICATIONS

This application claims the benefit of previously filed U.S. Provisional Patent Application No. 62/971,586, filed Feb. 7, 2020, the entire content of which is hereby incorporated by reference in its entirety.

FIELD OF THE DISCLOSURE

The present disclosure is directed to digital display systems. More particularly, the present disclosure is directed to a digital display structure and system for communicating with the digital display structure for an athletic event.

BACKGROUND

Digital display systems, such as digital displays used to communicate information such as a time, an information message, or the like, can be used to display information to a variety of different observers at different locations. Digital display devices have been commonly used for athletic events to display the elapsed time of a match or the time remaining in a match.

Typically, digital displays are disposed at various locations of an athletic field or arena so that spectators and/or participants in the applicable sport can monitor the amount of time elapsed, the amount of time remaining in the match, or the amount of time remaining in a period/quarter/half. Similarly, there are various clocks related to sub-aspects of an event, such as the shot clock in basketball, pitch clock in baseball, service clock in tennis, or the like.

Round-based sports, such as martial arts, mixed martial arts (MMA), boxing, and the like use a time-based round system, with the bout proceeding through a number of rounds that varies in accordance with the rules/standards of the particular organization sponsoring or overseeing the bout (including athletic commissions), as well at the level of competition and importance of the competition. In each case, the rounds may be timed, with judges assessing various hits, takedowns or other achievements of the bout to determine a decision for each of the participants.

In many athletic events, including MMA, it is desirable for both the participants and the spectators to know exactly how much time is remaining within the round or the event as a whole. However, the placement of the clock at the event can be difficult due to a desire to preserve various sightlines for spectators and cameramen capturing audiovisual content of the event, in particular spectators that have paid a considerable amount of money to attend the event. Currently, no official time is displayed, and only an unofficial clock is placed above and outside of the competitive area so that the clock is viewable by the spectators without blocking the view of the event.

Accordingly, it is difficult for fighters in a mixed martial arts bout to be able to observe the amount of time that is left in the round or the bout. This can also be the case because a fighter typically must be concerned with their own, and his or her opponent's position in the ring, and it may be undesirable for a fighter to raise their head or turn their eyes away from their opponent to look at the clock suspended above or outside the competition area. Particularly in mixed martial arts, bout participants find themselves in a myriad of positions both standing up and on the ground, further compromising their ability to locate the round clock in the arena.

In some competitions, including MMA, the referee has the ability to pause the clock, thereby adding time to the round or the competition. For example, in a soccer match, the referee may track the amount of time that occurs during a break in play caused by injury, and this time may be added to the end of the half. However, this information is not readily available to the spectators, athletes, coaches, or the commentators or television viewers. In some cases, the referee simply tracks the time via a traditional stopwatch, and reveals the amount of time remaining at the expiration of the traditional clock, allowing play to continue for the amount of "stoppage time."

In an MMA bout, the referee may pause the clock due to a foul or penalty occurring, or other applicable events, such as an equipment failure. Without any display, it can be unclear whether or not the clock has been paused by the official timekeeper. It may be desirable for the round to proceed without substantial delay because the physical endurance and the safety of the competitors is an important aspect of an MMA bout.

SUMMARY

It is an object of the present disclosure to provide a system for displaying an official adjusted time as determined by an official of an athletic competition.

It is a further object of the disclosure to transmit the adjusted time to other parties in real time.

In one aspect, a system for controlling a clock device is provided. The system includes: a remote computing device; a clock device in communication with the remote computing device; wherein the remote computing device includes at least one adjustment mechanism configured to adjust a time value and define an adjusted time value; wherein the clock device is configured to receive data corresponding to the adjusted time value; and wherein the clock device is configured to automatically display the adjusted time value.

In one aspect, the system includes a remote server in communication with the remote device, the remote server having instructions stored thereon configured to output an API including the adjusted time value.

In one aspect, the remote server is installed within the clock and controls a display of the clock.

In one aspect, the remote server is further configured to output a group of webpages.

In one aspect, the group of webpages includes the adjusted time value in a variety of fonts for different uses on different displays.

In one aspect, the remote server is further configured to output a API to a cloud server.

In one aspect, the adjusted time value is transmitted via API.

In one aspect, the clock includes a frame structure and a LED screen extending around a perimeter of the frame structure.

In one aspect, the system includes a support structure of a competition area, wherein the clock is disposed adjacent the support structure, wherein the LED screen extends laterally outward from the support and is visible from the competition area.

In one aspect, the competition area is defined by a plurality of wall sections defining an enclosed space, wherein the wall sections extend upward from a mat surface, wherein the clock device is disposed closer to the mat surface than an upper edge of the wall sections.

In one aspect, the frame structure includes an upper panel supported by a plurality of struts radiating from a vertical support rod.

In one aspect, the frame structure further includes a lower panel spaced away from the upper panel and backing structure extending between the upper panel and the lower panel.

In one aspect, the LED screen is supported by the backing structure.

In another aspect, a method for automatically displaying an adjusted time on clock display is provided. The method includes: adjusting a time value on a remote computing device and defining an adjusted time; transmitting the adjusted time to a clock device having a display screen; receiving data at the clock device associated with the adjusted time; and automatically displaying the adjusted time on the display screen.

In one aspect, the method includes outputting the adjusted time using Network Time Protocol.

In one aspect, the method includes outputting an API having the adjusted time data.

In one aspect, the method includes outputting a group of webpages displaying the time in a variety of fonts.

In one aspect, the method includes outputting the adjusted time to a cloud server.

In one aspect, the method includes providing access to authorized users to the adjusted time via the cloud server.

In one aspect, the method includes retrieving the adjusted time from the cloud server and broadcasting the adjusted time.

BRIEF DESCRIPTION OF THE DRAWINGS

Other aspects of the present disclosure will be readily appreciated, as the same becomes better understood by reference to the following detailed description when considered in connection with the accompanying drawings wherein:

FIGS. 8A-8E show schematic views of an LED screen of the clock device attached to the frame of the clock device and wrapping around the perimeter of the frame.

DETAILED DESCRIPTION OF THE DISCLOSURE

Figure 1:
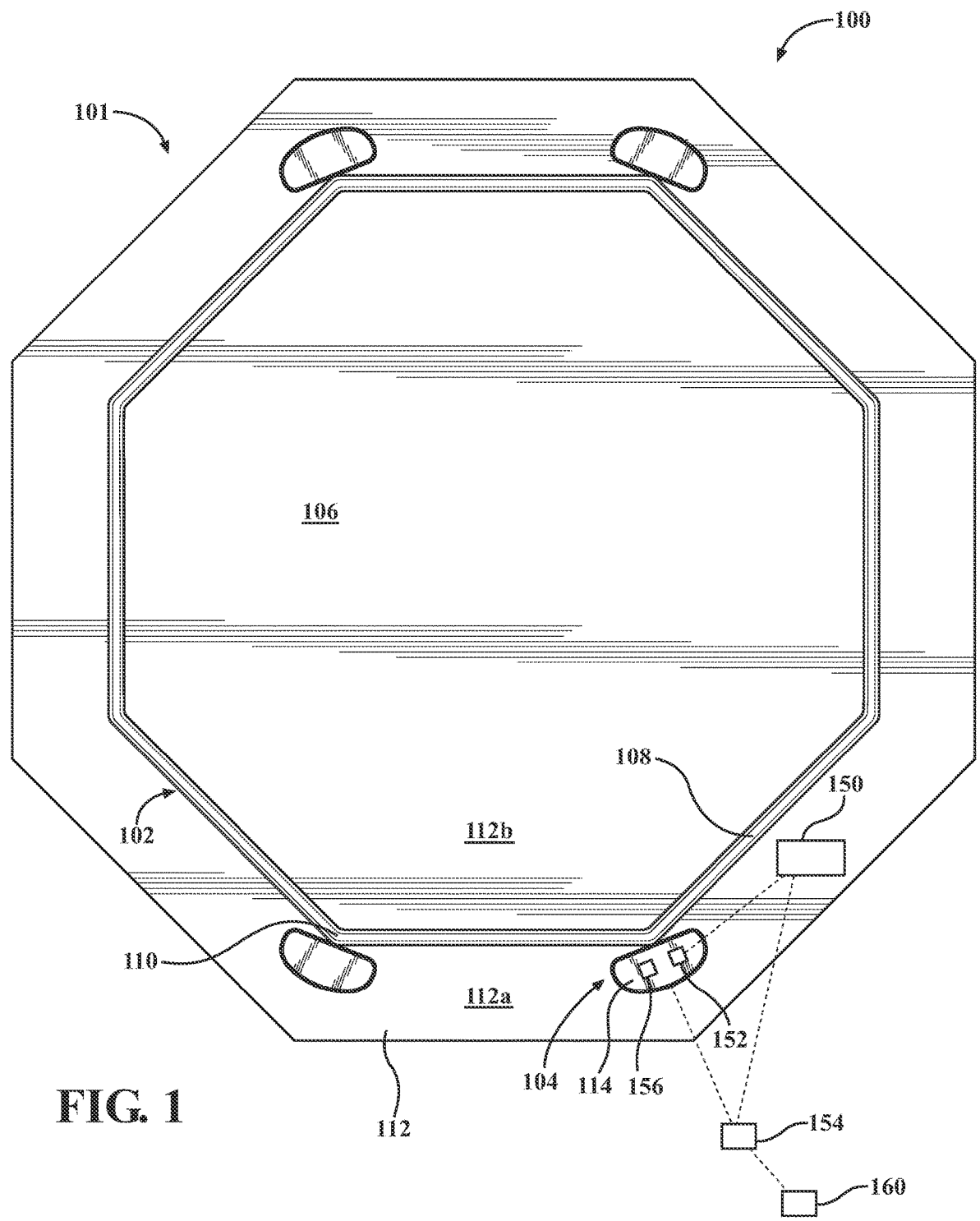
FIG. 1 is a plan view of an octagonal competition area including a clock device disposed adjacent the competition area.

With reference initially to FIG. 1, a time keeping system 100 for an athletic competition, such as an MMA bout in a non-limiting example, is illustrated. FIG. 1 illustrates a competition area 101, which may also be referred to as an octagon 102 based on the shape of the area, and further illustrates a digital display device 104 disposed adjacent the octagon 102. It will be appreciated that the reference to the octagon 102 may also apply to other shapes of the competition area 101 that may be used, such as a square traditionally used for a boxing ring, or other polygonal shapes, and may further apply to non-ring/octagon based competitions, such as soccer, basketball, hockey, football, or the like. For the purposes of further discussion, the octagon 102 will be referred to, as well as other aspects of the competition area associated with MMA b outing.

In one aspect, the octagon 102 includes a competition area 106 that is enclosed laterally by a closed loop defined by a plurality of connected wall sections 108. The wall sections 108 may be in the form of a chain link structure, thereby containing the fighters within while permitting spectators to view the fighters disposed within the octagon 102. The wall sections 108 may be coated within vinyl or other coating material to reduce potential for injury caused by impacting the chain link.

The octagon 102 may further include a plurality of supports 110 disposed at the plurality of intersections defined between laterally adjacent wall sections 108. Each wall section 108 may be secured to the supports 110 disposed at opposing lateral ends of the wall sections 108. The supports 110 may extend generally vertically from a horizontal mat surface 112 of the competition area 106.

The mat surface 112 may be disposed at an elevated location relative to the spectator area that generally surrounds the octagon, thereby defining an outer area 112a of the mat surface 112 disposed outside of the closed-loop defined by the wall sections 108 and an inner area 112b disposed inside of the closed loop defined by the wall sections 108. One or more of the wall sections 108 may include a gate/door/panel that is selectively openable such that individuals can enter/exit the enclosed area of the octagon 102.

The digital display device 104 may also be referred to as a clock 114. The clock 114 may be serve a variety of communication functions, including displaying the time remaining in a round, the score, the name of a fighter, advertising or sponsorship, or the like. For the purposes of discussion, reference to the clock 114 will be understood to encompass the various display functions and shall not be interpreted to be limited to time-keeping functionality.

In one aspect, the clock 114 may be disposed in the outer area 112a, such that the clock 114 is not disposed within the enclosed area 112b defined by the wall sections 108. Accordingly, the clock 114 may not be directly contacted by the fighters during the match. The clock 114 may be located adjacent one of the supports 110 and the wall sections 108 intersecting the support 110. The clock 114 may extend laterally outward relative to the support 110, such that the clock 114 may be viewable on each side of the support 110. In another aspect, the clock 114 may extended laterally outward from the support 110 on one side of the support 110. The clock 114 may be positioned symmetrically relative to the support 110 such that the clock 114 extends laterally outward approximately the same distance from the support 110. In another aspect, the clock 114 may be offset relative to the support 110.

In each of the above aspects, the clock 114 is at least partially visible through the wall section(s) 108. Accordingly, the fighters or participants in the octagon 102 are able to see the clock 114 and the information displayed thereon, such as the time remaining.

Figure 4:
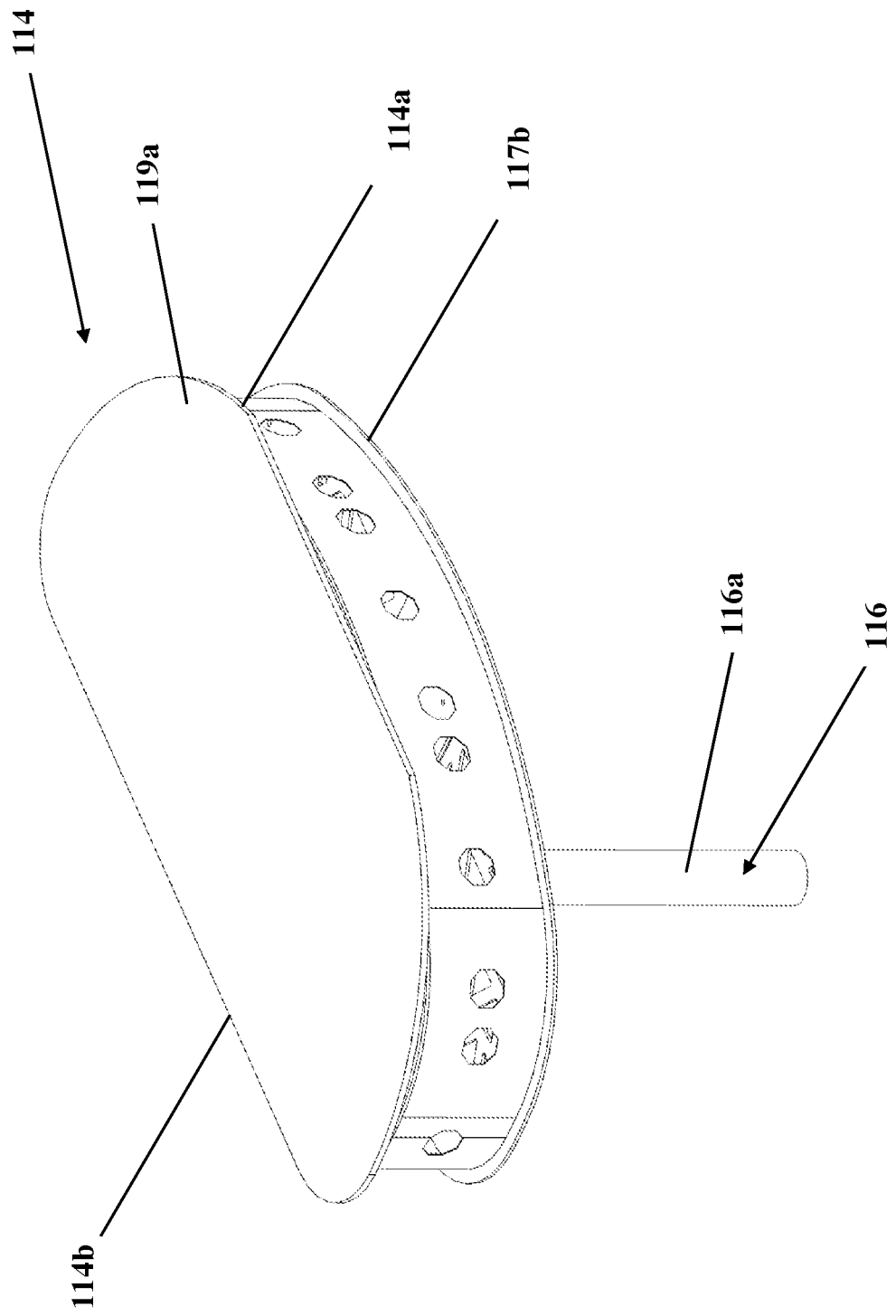
FIG. 4 is a front perspective view of a clock device.
Figure 5:
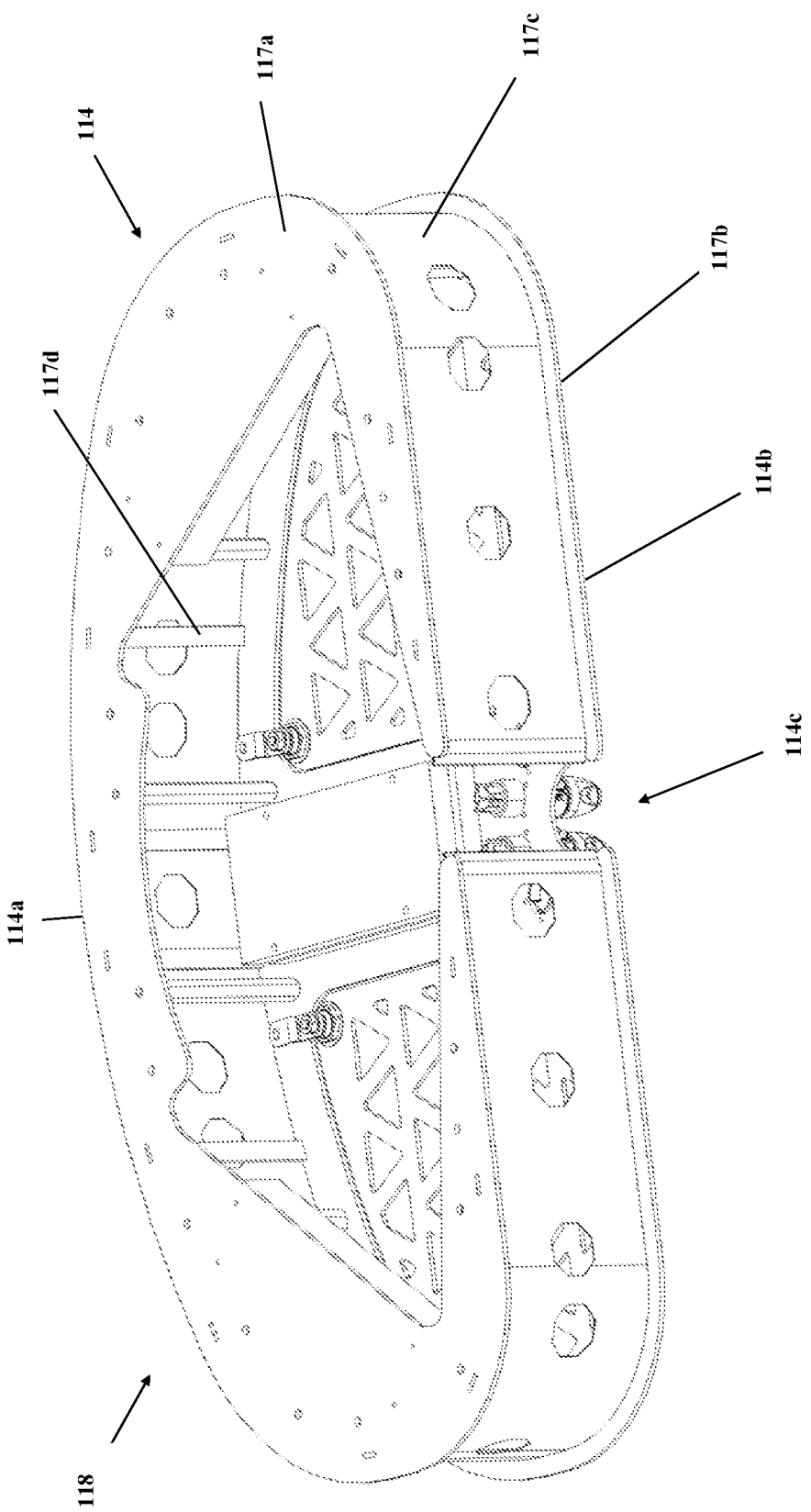
FIG. 5 is a rear perspective view of the clock device, illustrating upper and lower panels and a backing structure extending therebetween.
Figure 6:
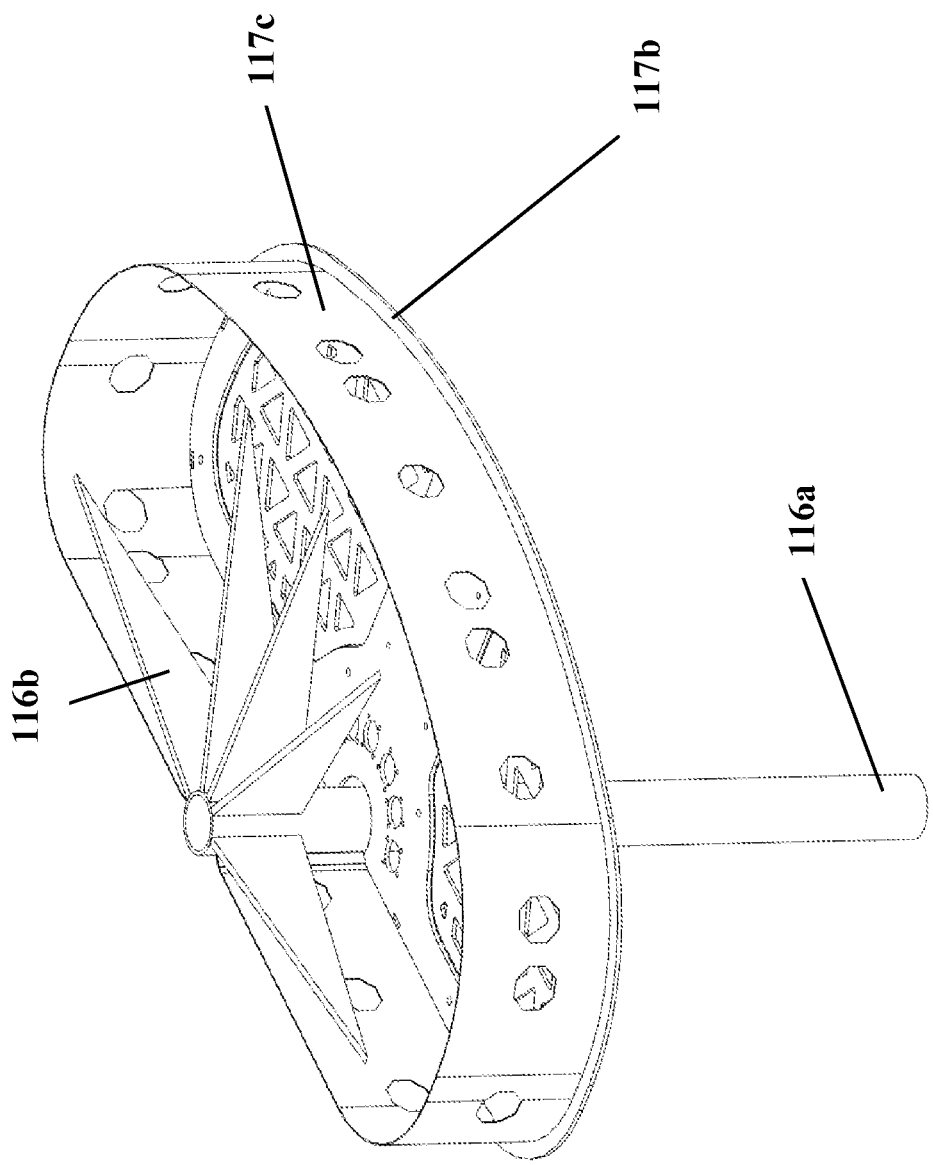
FIG. 6 is a front perspective view of the clock device with the upper panel removed, illustrating support struts of a stand for supporting the upper panel.

As described above, the clock 114 is disposed adjacent the wall sections 108 and the support 110. As shown in FIGS. 4-6, in one aspect, the clock 114 may have a generally trapezoidal shape with rounded corners. In one aspect, the clock 114 may have a generally convex shape at an outer edge 114a thereof. An inner edge 114b (facing the interior of the octagon 102) may be generally straight. The convex and straight shapes of the outer and inner edges, along with rounded corners, may therefore cooperate to define an overall curved profile of the clock 114.

In one aspect, as shown in FIG. 5, the clock 114 may include a recess 114c disposed approximately at the middle of the inner edge 114b. The recess 114c may be configured and shaped to accommodate various support structure shapes. This recess may accommodate a support structure or the like. Thus, the clock 114 may have a bean-shape and may wrap/curve around the support structure.

By shaping the clock 114 as described and shown, the curved outer edge 114a improves sightlines toward the octagon 102 relative to a box-shape. Similarly, by rounding the corners of the clock 114, the view toward the octagon 102 may also be improved.

However, it will be appreciated that other shapes of profiles of the clock 114 may also be used depending on the needs of the user. For example, the clock 114 may have a rectangle or square shape with rounded corners or the clock 114 may have a triangular shape with rounded corners. Other shapes, including non-symmetrical shapes, may also be used. Additionally, the corners may not be rounded.

As described above, the clock 114 may be disposed adjacent the support 110. The placement of the clock 114 adjacent the support 110 may be desirable due to the support 110 already partially limiting the view of the competition area. Accordingly, including the clock 114 adjacent the structure of the octagon 102 will not substantially impair the view of the competition area relative to existing layouts.

Figure 2:
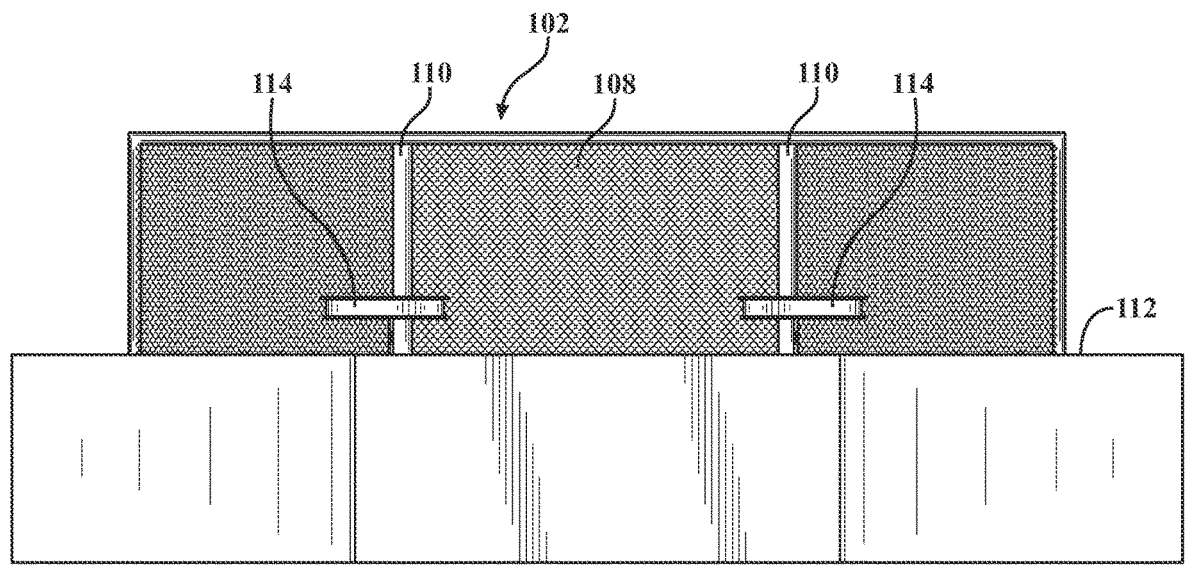
FIG. 2 is a front view of the competition area and the clock device.
Figure 3:
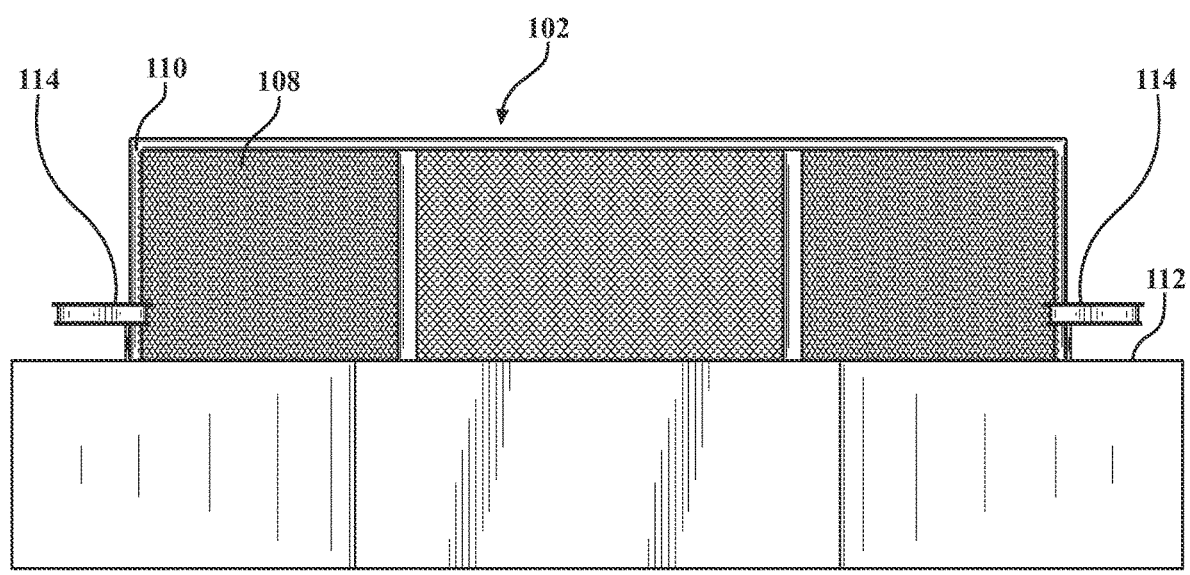
FIG. 3 is a side view of the competition area and the clock device.

The clock 114 may be positioned at an elevated position relative to the mat 112, as shown in FIGS. 2 and 3. In one aspect, the clock 114 may be placed 1-2 feet above the mat 112. In one aspect, the top surface of the clock 114 may be about 20 inches from the mat 112, and the vertical thickness of the clock 114 may be about 4-10 inches. Accordingly, the clock 114 may be positioned so as to not substantially impair the view of spectators, while being at a location that is easily viewable by the participants, such as the fighters and the referee. Thus, the clock 114 may be positioned above the mat 112 and spaced away from the mat 112, while also being positioned below the top of the wall sections 108. In one aspect, the clock 114 is disposed closer to the mat 112 than the top of the wall sections 108.

With reference to FIGS. 4-6, the clock 114 may be supported by a stand structure 116 extending below the clock 114, with the stand structure 116 supported by the support 110 and extending generally vertically. The stand structure 116 may be similar to the stand structure used for elevating and supporting a cameraperson on a platform. Indeed, the clock 114 may also operate as a platform on which a camera person may stand. The stand structure 116 is omitted from FIG. 5 for clarity. The stand structure 116 may include a vertical post 116a and a plurality of beams 116b radiating outward from the post 116a. The beams 116b may have a triangular plate shape, and may support an upper panel 117a. A lower panel 117b may be disposed below the upper panel 117a and spaced away from the upper panel 117a. A backing structure 117c may extend vertically between the upper panel 117a and the lower panel 117b. A plurality of vertical support struts 117d may extend between the upper panel 117a and the lower panel 117b. The panels 117a, 117b, the backing structure 117c, and the vertical struts 117d may combine to define an overall frame 118 of the clock 114. The frame 118 may be a metal frame that is formed into the general shape of the clock 114.

Figure 7:
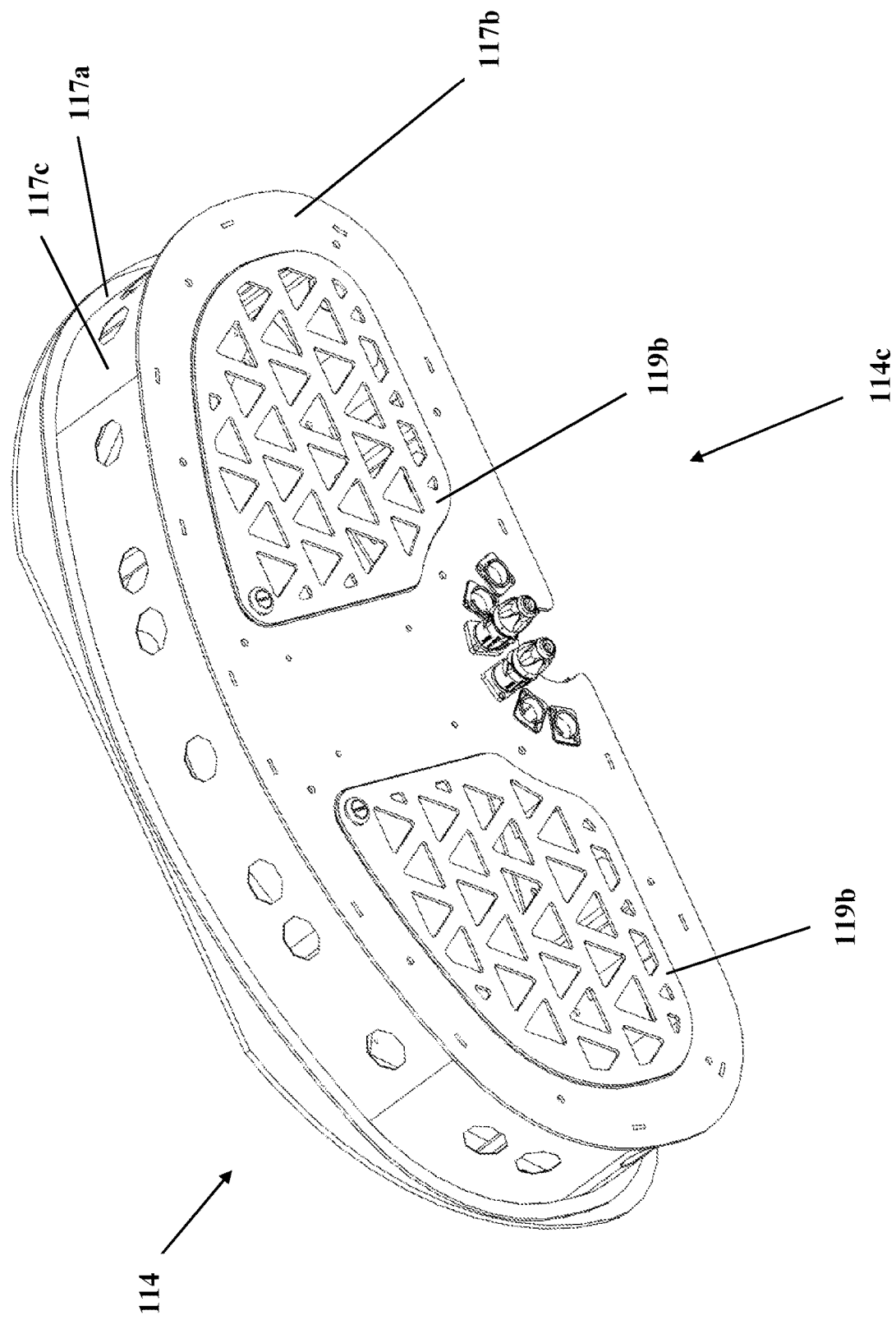
FIG. 7 is a bottom perspective view illustrating lower covers attached to the lower panel.
Figure 8A:
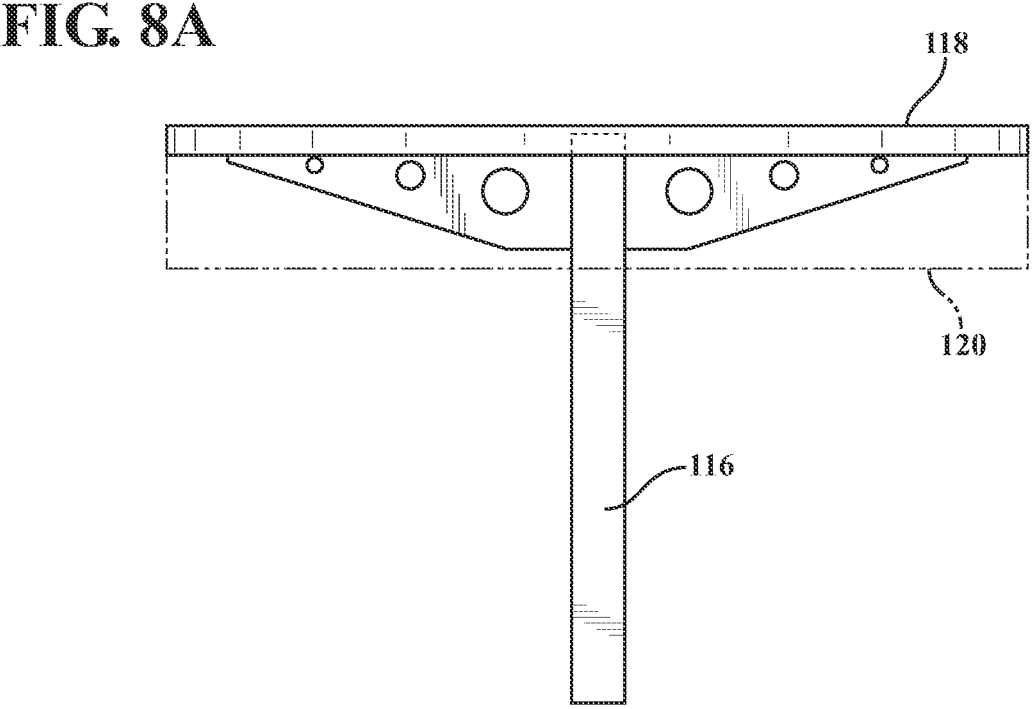
Figure 8B:
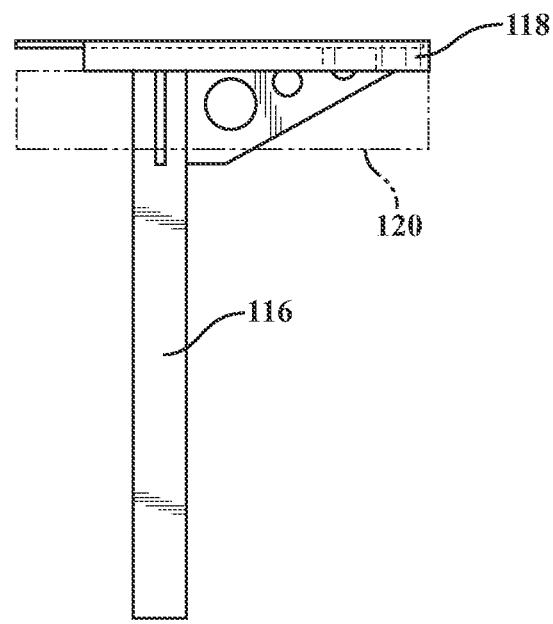

An upper cover 119a may be disposed over the upper panel 117a. The upper cover 119a may be similar to the platform on which a cameraperson can stand to record the bout. The clock 114 may further include lower covers 119b (FIG. 7) disposed on the lower frame. The upper cover 119a may substantially enclose the upper surface of the clock 114. The lower covers 119b may enclose the interior of the clock 114, while allowing air to flow in/out of the clock 114 for venting purposes. The panels 117a and 117b may include various cutouts or access holes for providing access for various wires, cables, or the like, or for providing access to the electronic components that are disposed within the clock 114.

With reference to FIGS. 8A-8E, the clock 114 further includes a display screen 120 supported by the frame 118. As described above, the frame 118 may define the generally rigid shape of the clock 114. The screen 120 may be in the form of a flexible LED screen, such that the screen 120 may bend and wrap around the perimeter defined by the frame 118 to define the generally curved overall shape of the screen 120 and the clock 114. The LED screen 120 may be attached to the backing structure 117c that extends vertically between the upper panel 117a and lower panel 117b of the frame 118.

The screen 120 may be a continuous LED screen and may be configured via display software to include multiple display zones 121, as shown in FIG. 8. The display zones 121 are modifiable in their size and the type of information they display, and may include time display zones 121a and a logo display zones 121b, which may be disposed at various locations along the curved outer profile of the clock 114 depending on the desires of the operator. Accordingly, the clock 114 is capable of displaying time and/or logos or other text both inside the competition area and outside of the competition area. In one aspect, the area of the clock 114 that faces the octagon 102 includes a pair of time display zones 121a on each side of the support 110. The time display zones 121a are therefore visible to the fighters and referee. The time display zones 121a may be controlled by an HTML, web source, in one aspect. The logo display zones 121b may be used to display an advertisement or other information, and may be disposed on the surface of the screen 120 facing away from the octagon 102 and toward the spectators. The time display zones 121a may also be disposed on portions of the screen facing the spectators. The time display zones 121a may alternate with the logo display zones 121b around the perimeter of the clock. It will be appreciated that various other arrangements of the zones may be used, and additional zones may be included. It will be further appreciated that the display screen 120 may be controlled such that the display zones can be replaced with other displays, such as a scrolling display or another information display. For example, prior to a competition beginning and when the clock is not being used for tracking time, the names of the fighters or a sponsor may be displayed across the display screen 120. The graphical display shown on the screen 120 may ultimately be controlled by the clock software, which is described in further detail below.

The support frame 118 may also be used as a support stand for camera operators that are broadcasting the bout. Typically, these camera operators stand on a support structure so as to be able to point the camera over the top of the wall sections 108 and supports 110. Accordingly, the clock 114 may be integrated with the stand structure/frame 118 and disposed below the location of the camera operator. It will be appreciated that additional clocks 114 may be disposed at other locations around the ring, even if a camera operator is not disposed at that location. However, the inclusion of additional clocks 114 at other locations may provide additional locations for camera operators to position themselves. In one aspect, 3-4 camera stands and 3-4 clocks 114 are disposed around the octagon 102. It will be appreciated that some camera stands may be provided without clocks 114 disposed underneath.

As described above, the clock 114 and the frame 118 thereof may further provide for installation of electronic or other components therein, such as power converters, receiver cards (for receiving LED video data), processors, controllers, and the like. In one aspect, the upper cover 119a may include ridges or other structure for improving grip of friction for the feet of the camera operator.

Thus, the above-described clock 114 may be provided as part of the system 100 to provide accurate timing and other information to the fighters and spectators in a non-intrusive manner. The clock 114 is part of the overall system 100 for monitoring and controlling the time remaining in the round/match/bout. Without the clock 114 provided herein, the fighters do not know how much time is left. Fighters typically have the amount of time communicated to them verbally by their cornermen, which can be inaccurate or which may not be heard due to crowd or other noise. Alternatively, they can glance up to the rafters of the arena to view an unofficial clock. Spectators are similarly unaware of an official clock. They are limited to viewing the unofficial clock in the rafters, which requires looking away from the action. As further described below, the clock 114 is configured to display the official time as controlled by the official timekeeper, and the official time is within the view of both the fighters and the spectators and conveniently located positions around the octagon 102.

The system 100 may further be configured to provide real time adjustments to the time remaining depending on the events that occur during the bout. For example, during the bout, the referee may determine that the clock 114 should be paused, for example to check on the status of an injured fighter or due to a foul being committed, and will signal the pause to the official timekeeper. It will be appreciated that other aspects of the bout may require adjustment of the clock by the referee. The referee, too, does not know the official time, typically relying on audial cues from the official timekeeper when ten seconds remain and when the round is over. While the official timekeeper may keep time with a traditional stopwatch or the like, the stopwatch information is not typically available to other parties, including the referee, the spectators, and the fighters.

Thus, in one aspect, the system 100 may further include a remote device 150 (shown schematically within the octagon 102 in FIG. 1), such as a remote timing device, configured to communicate with a remote server 152, the clock 114, and/or a cloud server 154. The remote device 150 and the remote server 152 may be in the form of computing devices and may include one or more types of communication hardware, including hardwired cables for dependability and security, Wi-Fi, Bluetooth, cellular radios, or the like. When disposed in close proximity, it may be preferable for communication connections to be hardwired for communication. The remote device 150 and the remote server 152 may further include non-transitory computer readable storage media with instructions stored thereon, such as software, configured to receive, process, and transmit data between various connected devices.

The remote device 150 may include various buttons or other actuating mechanisms for adjusting the time remaining on the clock 114. The buttons or actuating mechanisms may be physical or touchscreen-based buttons. In one aspect, the remote device 150 may be configured to be actuated to pause the clock, add a predetermined amount of time, subtract a predetermined amount of time, and/or may include other timing adjustment mechanisms, such as a manual adjustment for setting specific time. The remote device 150 is configured to transmit data in real-time to the remote server 152 regarding any changes to the time remaining in the competition. In one aspect, the start and stop buttons may be physical buttons as well as touchscreen buttons, with the remaining buttons being touchscreen buttons.

The buttons of the remote device 150 may include a start button, a pause button, a stop button, a plus (+) button, and a minus (−) button. To operate the clock 114, the official timekeeper may press the start button. The start button may be configured to begin a countdown of a predetermined time (such as 5 minutes). The pause button pauses the countdown. The stop button stops the countdown. When the countdown is stopped or paused, the user can adjust the time using the plus and/or minus buttons. If the countdown reaches zero, the clock 114 may undergo a reset procedure where, after a predetermined amount of time (such as 50 seconds), the clock 114 will reset to the predetermined overall time for the next countdown (such as 5 minutes). During a bout, a referee officiating the bout may signal to the official timekeeper to call the start, a pause, or a stop, and the timekeeper controls the countdown via the remote device 150. The referee typically does not have his or her own method of tracking the time. In some instances, when the referee stops the bout but the timekeeper is late in executing a stop, the official time would be based on what the timekeeper did. The timekeeper can correct this error by adding/subtracting time depending on the situation.

In one aspect, the clock 114 does not include provisions for an outside user to adjust the predetermined time on the clock 114, and as such, there may be no user settings directly available on the clock 114. Rather, the clock 114 may be limited to showing whether it is connected and what its IP address is.

The remote server 152 is configured to receive the timing data from the remote device 150 in real time, and is further configured to update the official time for display on the clock 114. The remote server 152 may be disposed in close proximity to the remote device 150, such as near the octagon 102. The remote server 152 may be further configured to communicate directly or via other intermediate servers with the cloud server 154. In another aspect, the remote server 152 itself may be a cloud-based server, or the remote server 152 may be part of the clock 114. In one aspect, clients on the same network may access a webpage hosted by the clock 114 acting as the remote server 152, and the clock device 114 may further be the device that outputs the API accessible to those on the same network. Additionally, the clock 114 may push this various data to the cloud server 154.

The clock software may be developed using JavaScript, NodeJS, and Electron open-source programming language and frameworks. The clock hardware may be consumer grade hardware, such as raspberry Pi, touchscreens, cabling, and buttons. The remote device 150 may also be similar consumer grade hardware capable of communicating data and running the aspects of the clock software.

Upon starting up, the clock hardware will launch the clock software on one or more of the above-described devices. The clock software may be configured to continually check for a network and may display its connection status. Upon locating a network, the clock 114 obtains and displays its IP address. The clock 114 may then sync its time to the network using "Network Time Protocol," which is included with standard Linux distributions.

The clock software may include several output formats. One output format is an API, which users can access on the network and obtain the clock status as well as millisecond timestamps for relevant actions. Another output is a group of webpages that display the time in various fonts and sizes for different uses, such as for end-users, broadcast graphics, and the clock display such as the LED display 120. A further output is an API pushed to a cloud system that is maintained for a live scoring product, with this API updating the clock actions. In one example, this API is a REST API, however other protocols may be used.

Client devices for the above outputs are able to sync via the Network Time Protocol, and the client devices may calculate their own countdowns based on the timestamp provided by the clock software. Network Time Protocol drift is extremely small (such as 0.00 to 0.09 seconds), and therefore multiple units on the same network may display the time accurately. If the official clock/time/countdown changes in response to adjustments made at the remote device 150, the Network Time Protocol will sync the time on the other client devices, including the remote server 152/clock 114.

Once the clock 114 is on the network, its API and webpage outputs are available at its IP address, which is not shared with third parties except those that need the timing information. Thus, access to the API and webpages may be limited only to authorized users.

In one aspect, the clock 114 may include a controller 156 in communication with one or more of the remote device 150, the remote server 152, and/or the cloud server 154. The clock 114 is configured to receive data from the remote device 150, remote server 152, and/or cloud server 154, in particular data regarding the time remaining in the contest as modified, adjusted, and transmitted by the remote device 150. The clock 114 is further configured to display the accurate time remaining in response to adjustment performed at the remote device 150. In one aspect, the clock 114 receives a signal from the remote device 150 including time data having the official time, and the clock software running on the clock 114 will output the time data to the cloud and/or other client devices.

In addition to updating the clock 114 in real time, in response to adjustment at the remote device 150, the remove server 152 or cloud server 154 may be configured to be accessible by third parties. For example, broadcasters or similar entities displaying the bout at remote locations, such as televisions, computers, phones, tablets, or the like, may receive the accurate timing time data in real time and the time display of the broadcaster may be automatically updated. Similarly, a website or other statistical tracking system can display the actual time remaining in addition to the statistics of the bout. In another aspect, live-betting entities may receive the accurate time remaining in real time.

The distribution of the accurate time as defined by the remote device 150 may be accomplished via the use of an API or similar data format, such that various third party entities may receive and display the same data.

In one aspect, the remote device 150, remote server 152, cloud server 154, and clock 114 may communicate with each other both directly and indirectly. Put another way, the data from the remote device 150 may be routed through one of these devices and received at a further device downstream, or the data from the remote device 150 may be directly communicated to devices that are within range for direct communication. Preferably, the remote server 152 is part of the clock 114, and the clock 114 performs the processing of the time data.

In another aspect, event operators or other authorized users may access the system 100 and modify the time or other data associated with the event. In this approach, a second remote device 160 may be in communication with the remote server 152. The second remote device 160 may include controls similar to the remote device 150, and may further include additional controls for transmitting data to the remote server 152, cloud server 154, or clock 114. For example, the second remote device 160 may provide data or instructions to display text, logos, statistics, or other desirable information for display on the clock 114.

It will be appreciated that various other hardware and software combinations may be used to receive and the display the accurate time on the clock 114 and the display 120. In one aspect, the clock 114 includes the controller 156, which may be a computer capable of syncing to Network Time Protocol. One example is an Apple/MacOS computer due to MacOS being based on UNIX. However, other computers capable of syncing to NTP may be used. Additionally, software to open the webpage outputs showing the live time described above may be used. In one aspect, this software is web browser software. Additional software may include software configured to generate and update a graphic output sized to the pixel dimensions of the LED display 120. Such software may be third party software, such as Resolume. However, other similar types of graphical display software may be used. In one aspect, an HDMI output is included and configured to display the formatted video that is output from the Resolume software. An LED driver may also be included. The LED driver may be supplied by an LED vendor configured to format the signal correctly for the display 120. Backups for each of these units may also be provided.

Thus, in view of the above, the time associated with the competition can be updated directly by the official timekeeper and communicated to multiple parties and displayed on the clock 114, thereby permitting the referee, fighters, spectators, broadcasters, video audience, and other interested parties to view the official accurate time in real time as modified by the official timekeeper via the remote device 150.

In one aspect, the ability to transmit and display the official accurate time may allow for an official to correctly determine whether a strike landed during a round or whether it landed after time expired. In some states, instant replay is permitted to make this assessment. However, even when instant replay is permitted, officials have been reliant on listening for the sound of the horn indicating the end of the round. With the disclosed system 100, the official time may be displayed on the video being used in the replay.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A system for controlling a clock device, the system comprising:
a remote computing device;
a clock device in communication with the remote computing device;
wherein the remote computing device includes at least one adjustment mechanism configured to adjust a time value and define an adjusted time value;
wherein the clock device is configured to receive data corresponding to the adjusted time value; and
wherein the clock device is configured to automatically display the adjusted time value;
wherein the clock includes a frame structure and a LED screen extending around a perimeter of the frame structure;
further comprising a support structure of a competition area, wherein the clock device is disposed adjacent the support structure, wherein the LED screen extends laterally outward from the support structure and is visible from the competition area;
wherein the competition area is defined by a plurality of wall sections defining an enclosed space, wherein the wall sections extend upward from a mat surface, wherein the clock device is disposed closer to the mat surface than an upper edge of the wall sections.

2. The system of claim 1, wherein the system includes a remote server in communication with the remote device, the remote server having instructions stored thereon configured to output an Application Programming Interface (API) including the adjusted time value.

3. The system of claim 2, wherein the remote server is installed within the clock and controls a display of the clock.

4. The system of claim 2, wherein the remote server is further configured to output a group of webpages.

5. The system of claim 4, wherein the group of webpages includes the adjusted time value in a variety of fonts for different uses on different displays.

6. The system of claim 2, wherein the remote server is further configured to output an Application Programming Interface (API) to a cloud server.

7. The system of claim 1, wherein the adjusted time value is transmitted via Application Programming Interface (API).

8. A system for controlling a clock device, the system comprising:
a remote computing device;
a clock device in communication with the remote computing device;
wherein the remote computing device includes at least one adjustment mechanism configured to adjust a time value and define an adjusted time value;
wherein the clock device is configured to receive data corresponding to the adjusted time value; and
wherein the clock device is configured to automatically display the adjusted time value;
wherein the clock device includes a frame structure and a LED screen extending around a perimeter of the frame structure;
wherein the frame structure includes an upper panel supported by a plurality of struts radiating from a vertical support rod.

9. The system of claim 8, wherein the frame structure further includes a lower panel spaced away from the upper panel and backing structure extending between the upper panel and the lower panel.

10. The system of claim 9, wherein the LED screen is supported by the backing structure.

11. A method for automatically displaying an adjusted time on clock display, the method comprising:
adjusting a time value on a remote computing device and defining an adjusted time;
transmitting the adjusted time to a clock device having a display screen;
receiving data at the clock device associated with the adjusted time; and
automatically displaying the adjusted time on the display screen;
wherein the clock device includes a frame structure and the display screen is an LED screen extending around a perimeter of the frame structure;
disposing the clock device adjacent a support structure of a competition area, wherein the clock is disposed adjacent the support structure, wherein the LED screen extends laterally outward from the support structure and is visible from the competition area;
wherein the competition area is defined by a plurality of wall sections defining an enclosed space, wherein the wall sections extend upward from a mat surface, wherein the clock device is disposed closer to the mat surface than an upper edge of the wall sections.

12. The method of claim 11, further comprising outputting the adjusted time using Network Time Protocol.

13. The method of claim 11, further comprising outputting an Application Programming Interface (API) having the adjusted time data.

14. The method of claim 11, further comprising outputting a group of webpages displaying the time in a variety of fonts.

15. The method of claim 11, further comprising outputting the adjusted time to a cloud server.

16. The method of claim 15, further comprising providing access to authorized users to the adjusted time via the cloud server.

17. The method of claim 16, further comprising retrieving the adjusted time from the cloud server and broadcasting the adjusted time.

18. A method for automatically displaying an adjusted time on clock display, the method comprising:
adjusting a time value on a remote computing device and defining an adjusted time;
transmitting the adjusted time to a clock device having a display screen;
receiving data at the clock device associated with the adjusted time; and
automatically displaying the adjusted time on the display screen;
wherein the clock device includes a frame structure and the display screen is an LED screen extending around a perimeter of the frame structure;
wherein the frame structure includes an upper panel supported by a plurality of struts radiating from a vertical support rod.

19. The method of claim 18, wherein the frame structure further includes a lower panel spaced away from the upper panel and backing structure extending between the upper panel and the lower panel.

20. The method of claim 19, wherein the LED screen is supported by the backing structure.

* * * * *